United States Patent [19]

Magyar

[11] 4,111,459
[45] Sep. 5, 1978

[54] SEAT BELT UTILIZATION RECORDER

[75] Inventor: Joseph J. Magyar, Rochester, Mich.

[73] Assignee: General Motors Corporation, Detroit, Mich.

[21] Appl. No.: 831,957

[22] Filed: Sep. 9, 1977

[51] Int. Cl. .............................................. B60r 21/10
[52] U.S. Cl. ............................... 280/744; 116/114 R; 280/746; 297/385
[58] Field of Search ...................... 280/744, 746, 747; 116/114 R, 114 AE, 114 AH; 297/385, 388, 386; 188/1 C

[56] References Cited

U.S. PATENT DOCUMENTS

| | | | |
|---|---|---|---|
| 3,361,475 | 1/1968 | Villiers | 280/746 |
| 3,428,362 | 2/1969 | Bertelson | 297/385 |
| 3,438,674 | 4/1969 | Radke et al. | 280/746 |
| 3,765,700 | 10/1973 | Littman | 280/746 |
| 3,858,904 | 1/1975 | Saxl | 280/746 |

Primary Examiner—Robert R. Song
Attorney, Agent, or Firm—Charles E. Leahy

[57] ABSTRACT

A seat belt mounting member such as a retractor frame or an apertured plate has an elongated slot extending generally in the direction of imposition of occupant restraint load and a load bearing wall at the end of the slot. A fastener extends through the slot and attaches the mounting member on a vehicle body structural member. A means such as coined tabs or a frangible glass disc is located in the slot in interposition between the fastener and the load bearing wall to define a normal position of the mounting member relative the fastener wherein the load bearing wall is spaced from the fastener. The frangible or deformable means has a predetermined limited load sustaining capability and is permanently altered upon imposition of a predetermined occupant restraining load upon the belt to provide a permanent record of load imposition and permit limited bodily shifting movement of the mounting member whereby the fastener traverses the slot to engage the load bearing wall and thereby anchor the seat belt for effective restraint of the occupant. According to the preferred embodiment of the invention a deformable means is provided by coining tabs in the mounting member adjacent the slots to project into the slot, the tabs being permanently deformed by the fastener to provide a record of load imposition. According to another embodiment of the invention, a frangible glass disc is mounted in the slot and is broken by the fastener to provide a record of load imposition.

3 Claims, 7 Drawing Figures

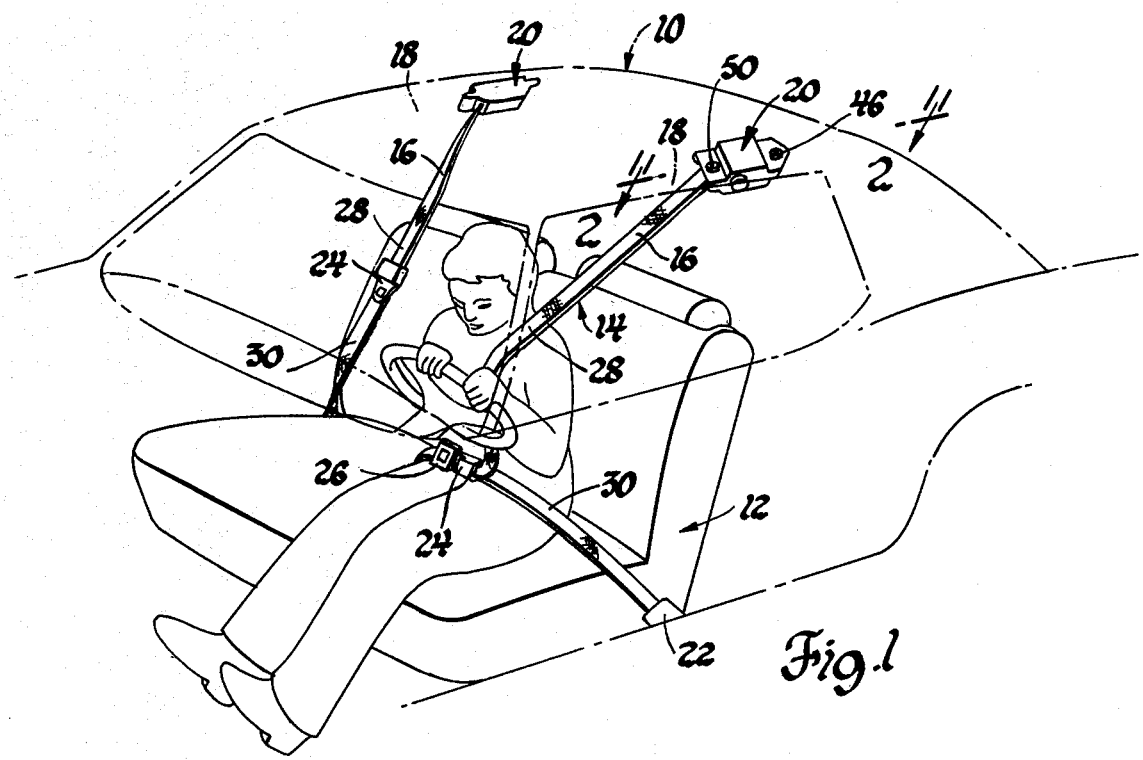
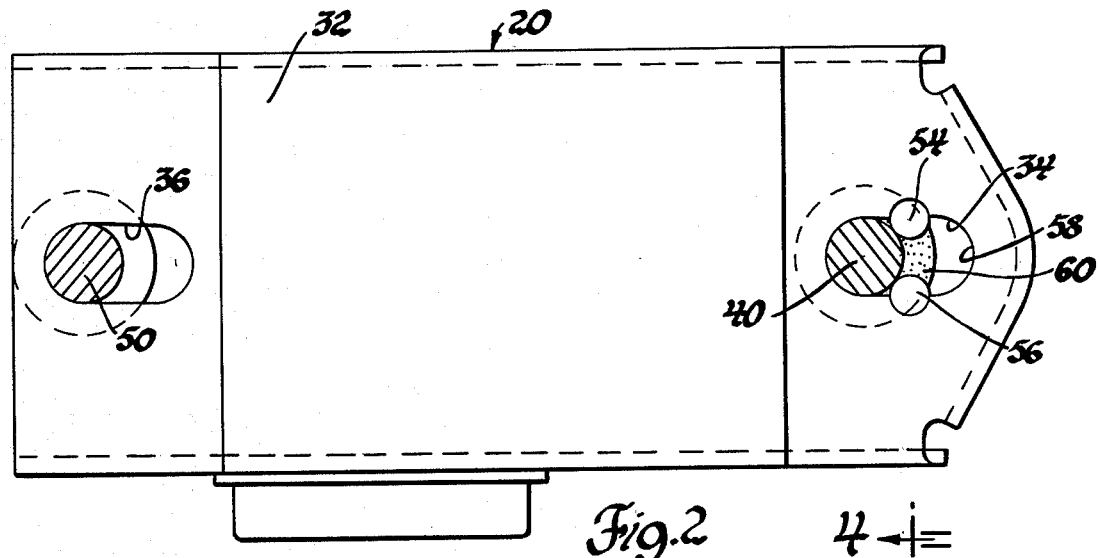
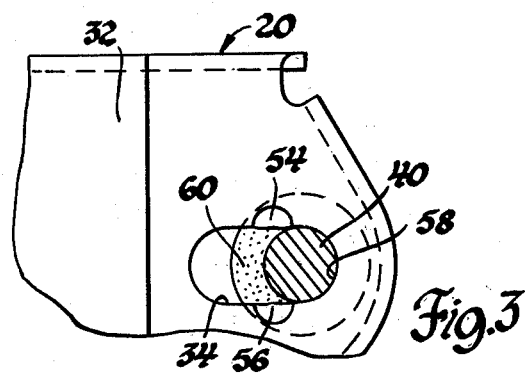
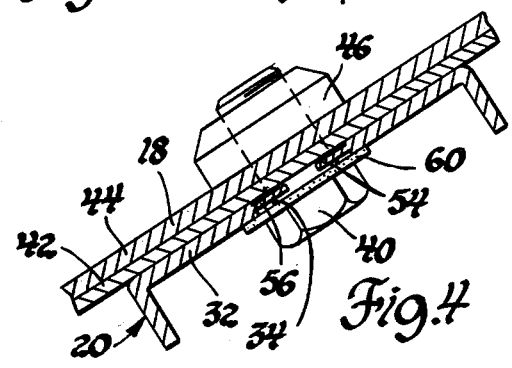

SEAT BELT UTILIZATION RECORDER

The invention relates to an anchorage device for attaching a seat belt on a vehicle body structural member and providing a record of imposition of a predetermined occupant restraint load on the seat belt.

Conventional vehicle occupant restraint belt systems employ a lap belt and/or shoulder belt which are anchored on a structural member of the vehicle body by a retractor which winds and unwinds the belt to a length suited to fit the seated position of a particular occupant. It is desirable in such occupant restraint systems to provide a recording means associated with the belt system by which visual examination will disclose whether the occupant was wearing the seat belt at the time of an emergency calling for restraint of the occupant.

One such seat belt utilization indicator is the subject of U.S. Pat. No. 3,428,362, entitled "Seat Belt Utilization Indicator" and issued to Peter C. Bertelson et al. According to that patent, a seat belt element has a closed loop positioned so that a portion of the loop extends through the aperture in a mounting member secured to a structural element of the vehicle body. Deformable means are positioned in the aperture between the seat belt loop and a sidewall of the aperture whereby the deformable means will be deformed upon a tensioning force being applied to the belt segment as it restrains the body of a vehicle passenger.

A shortcoming of the Bertelson utilization indicator is that it is limited to use in belt systems where a fixed length of belt is attached to the vehicle body by an apertured mounting member. The Bertelson utilization indicator cannot be employed in a seat belt system where the belt is wound and unwound from the spring biased reel of a retractor because the belt end is not looped through an apertured mounting member.

The object, feature and advantage of this invention resides in the provision of a seat belt utilization recorder which may be employed in association with a seat belt retractor or an apertured mounting member.

According to the invention, a seat belt mounting member such as a retractor frame or an apertured plate has an elongated slot extending generally in the direction of imposition of occupant restraint load and a load bearing wall at the end of the slot. A fastener extends through the slot and attaches the mounting member on a vehicle body structural member. A deformable or frangible means is located in the slot in interposition between the fastener and the load bearing wall to define a normal position of the mounting member relative to the fastener wherein the load bearing wall is spaced from the fastener. The frangible or deformable means has a predetermined limited load sustaining capability and is permanently altered upon imposition of a predetermined occupant restraining load upon the belt to provide a permanent record of load imposition and permit limited bodily shifting movement of the mounting member whereby the fastener traverses the slot to engage the load bearing wall and thereby anchor the seat belt for effective restraint of the occupant. According to the preferred embodiment of the invention a deformable means is provided by coining tabs in the mounting member adjacent the slots to project into the slot, the tabs being permanently deformed by the fastener to provide a record of load imposition. According to another embodiment of the invention, a frangible glass disc is mounted in the slot and is broken by the fastener to provide a record of load imposition.

These and other objects, features and advantages of the invention will become apparent upon consideration of the specification and the appended drawings in which:

FIG. 1 is a perspective view of a vehicle occupant restraint system embodying the invention;

FIG. 2 is a view of the shoulder belt retractor of the restraint system taken in the direction of arrows 2—2 of FIG. 1;

FIG. 3 is a partial fragmentary view similar to FIG. 2 but showing the retractor after imposition of a load thereon;

FIG. 4 is a sectional view taken in the direction of arrows 4—4 of FIG. 2;

Figure 5:
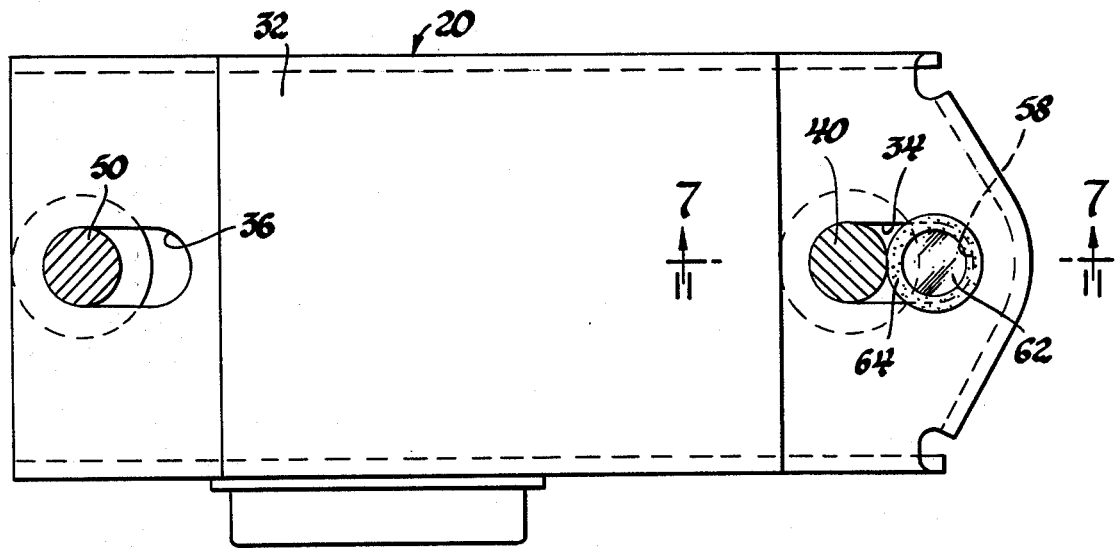
FIG. 5 is a view similar to FIG. 2 showing a second embodiment of the invention.

Referring to FIG. 1, a vehicle body 10 has an opponent seat 12 and a restraint belt system 14 for restraining an occupant in the seat 12. The restraint belt system 14 includes a strap 16 having one end attached to the roof rail 18 of the vehicle body by a shoulder belt retractor 20 and the other end attached to the sill of the vehicle body by an anchor plate 22. A D-ring 24 is slidably engaged on the belt and is engageable in a buckle 26 attached to the vehicle body inboard the occupant to divide the strap 16 into a shoulder belt 28 and a lap belt 30. FIG. 1 also shows an identical occupant restraint belt system at the other side of the vehicle seat for restraining a vehicle passenger and having like numbered elements.

Referring to FIG. 2, it will be understood that the shoulder belt retractor 20 includes a retractor frame 32 on which a belt reel, not shown, is rotatably journalled. The end of strap 16 is attached to the reel for winding thereon by a spring. A pendulum operated lock bar, not shown, is engageable with the reel in response to a predetermined inertia stimulus to block the reel against belt unwinding so that the length of the strap 16 is fixed to restrain the occupant in the seat 12. The structure and operation of such a shoulder belt retractor is shown in U.S. Pat. No. 3,901,460, entitled "Restraint Belt Retractor with Pendulum Actuated Locking," which is incorporated herein by reference.

The retractor frame 32 has elongated bolt slots 34 and 36 located at its ends and extending generally longitudinally of the vehicle; i.e., the direction of imposition of occupant restraint load on the retractor. As best seen in FIG. 4, bolt 40 extends through the slot 34 and through aligned apertures of an inner panel 42 and outer panel 44 comprising the roof rail 18. A nut 46 is threadedly engaged on the end of bolt 40 to connect the retractor frame 32 to the roof rail 18. A like nut and bolt 50 extend through the slot 36 at the forward end of the retractor frame 32 and a mating aperture of the roof rail 18.

As best seen in FIGS. 2 and 4, the retractor frame 32 has integral tabs 54 and 56 which are coined in the retractor frame 32 adjacent the slot 34 and project into the slot generally midway the ends thereof. The retractor 20 is positioned relative the bolt 40 so that tabs 54 and 56 are interposed between the bolt 40 and a rearward wall 58 of the slot 34. The relative spacing between the bolts 40 and 50 and the slots 34 and 36 is such that bolt 50 is simultaneously located at the forward end of its associated slot 36.

Referring again to FIG. 1, it will be understood that the occurrence of a predetermined level of vehicle deceleration during an emergency stop causes the pendulum or like inertia sensing mechanism associated with the retractor 20 to lock the belt reel against unwinding rotation. The forward momentum of the occupant and the deceleration of the vehicle body result in the imposition of an occupant restraining load upon the shoulder belt 28 and lap belt 30. If the occupant restraining load attains a level which exceeds the force sustaining capability of the integral tabs 54 and 56, the tabs are deformed or sheared as seen in FIG. 3 to allow limited forward movement of the retractor 20 relative the bolts 40 and 50. The bolt 40 has a washer 60 of Teflon or the like which overlies the retractor frame 32 and spaces the head of bolt 40 therefrom to facilitate sliding movement. As seen in FIG. 3, forward movement of the retractor frame 32 carries the load bearing end wall 58 of the retractor frame 32 into load bearing engagement with the bolt 40. Accordingly, further forward movement of the retractor 20 is prevented and the occupant is restrained in the seat 12.

Figure 7:
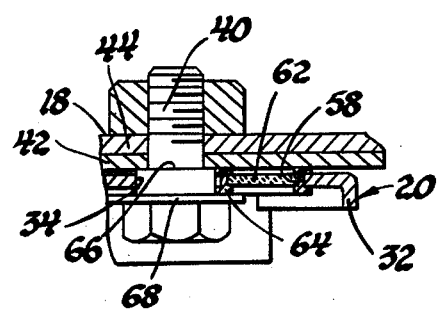
FIG. 7 is a sectional view taken in the direction of arrows 7—7 of FIG. 5.

Referring to FIGS. 5 and 7, a second embodiment of the invention is shown. Those elements of the second embodiment which are identical to the first embodiment are identified by like numerals.

Referring to FIG. 7, it is seen that the deformable element interposed between the bolt 40 and the end wall 58 of the slot 34 is comprised of a glass disc 62 which is housed by an injecton molded plastic retainer 64. As best seen in FIG. 7, the retainer 64 is annular in shape and has an I-shaped cross section defining an inwardly opening channel for receiving the peripheral edge of the glass disc 62 and an outwardly facing channel which receives the walls of retractor frame 32 defining the slot 34. The bolt 40 of FIG. 7 has a shoulder 66 which spaces an integral washer 68 of the bolt away from the roof rail 18 to prevent the glass disc 62 from being broken during assembly and to facilitate sliding movement of the retractor frame 32.

Figure 6:
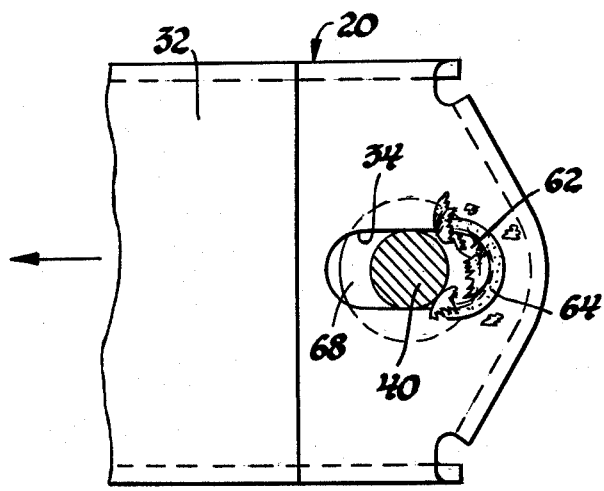
FIG. 6 is a partial fragmentary view of FIG. 5 but showing the shoulder belt retractor after imposition of a seat belt load thereon.

Referring to FIG. 5, it is seen that the glass disc 62 and its retainer 64 are interposed between the bolt 40 and the end wall 58 of the slot. Accordingly, imposition of an occupant restraint force on the belt and retractor which exceeds the load sustaining capability of the glass disc 62 causes fracture of the disc 62 as seen in FIG. 6 to permit forward bodily shifting movement of the retractor 20. Such forward movement of the retractor is limited by engagement of the slot end wall 58 with the bolt 40 so that forward movement is limited.

The deformation of the coined tabs 54 and 56 or the breakage of the glass disc 62 provides a permanent record of the occurrence of imposition of an occupant restraining load in the belt system. The first embodiment has the advantage of being economical of manufacture because the coined tabs are formed integrally with the retractor housing and no additional parts are required in addition to those normally and conventionally required in a seat belt system. The glass disc 62 of the second embodiment of the invention has the advantage of being easily replaced.

It will be understood that this invention may be utilized in conjunction with either a belt retractor or an apertured mounting member which may be mounted on any suitably located structural member of the vehicle body.

The embodiments of the invention in which an exclusive property or privilege is claimed are defined as follows:

1. An anchorage device for attaching a seat belt on a vehicle body structural member and for providing a record of imposition of a predetermined occupant restraint load on the seat belt, said anchorage device comprising: a seat belt mounting member having the seat belt attached thereto, said mounting member having an elongated slot extending generally in the direction of imposition of occupant restraint load and having a load bearing wall at one end of the slot, a fastener extending through the slot and attaching the mounting member on the structural member, means located in the slot in interposition between the fastener and the load bearing wall to space the load bearing wall from the fastener, said means having a predetermined limited load sustaining capability and being permanently altered upon imposition of an occupant restraint seat belt load greater than the predetermined load sustaining capability to provide a permanent record of load imposition and permit limited bodily shifting movement of the mounting member whereby the fastener traverses the slot to engage the load bearing wall and thereby anchor the seat belt for restraint of the occupant.

2. An anchorage device for attaching a seat belt on a vehicle body structural member and for providing a record of imposition of a predetermined occupant restraint load on the seat belt, said anchorage device comprising: a seat belt mounting member having the seat belt attached thereto, said mounting member having an elongated slot extending generally in the direction of imposition of occupant restraint load and having a load bearing wall at one end of the slot, a fastener extending through the slot and attaching the mounting member on the structural member, a frangible element located in the slot in interposition between the fastener and the load bearing wall to space the load bearing wall from the fastener and adjacent the end of slot opposite the load bearing wall, said frangible element having a predetermined limited load sustaining capability and being broken upon imposition of an occupant restraint seat belt load greater than the predetermined load sustaining capability to record load imposition and permit bodily shifting movement of the mounting member whereby the fastener traverses the slot to engage the bearing wall and thereby anchor the seat belt for restraint of the occupant.

3. An anchorage device for attaching a seat belt on a vehicle body structural member and for providing a record of imposition of a predetermined occupant restraint load on the seat belt, said anchorage device comprising: a seat belt mounting member having the seat belt attached thereto, said mounting member having an elongated slot extending generally in the direction of imposition of occupant restraint load and having a load bearing wall at one end of the slot, a fastener extending through the slot and attaching the mounting member on the structural member, projecting tab means integral with the mounting member and projecting into the slot in interposition between the fastener and the load bearing wall to space the load bearing wall from the fastener, said projecting tab means having a predetermined limited load sustaining capability and being permanently deformed by the fastener upon imposition of an occupant restraint seat belt load greater than the predetermined load sustaining capability to provide a permanent record of load imposition and permit bodily shifting movement of the mounting member whereby the fastener traverses the slot to engage the bearing wall and thereby anchor the seat belt for restraint of the occupant.

* * * * *